United States Patent Office 3,297,476
Patented Jan. 10, 1967

3,297,476
PRODUCTION OF NON-BLOCKING ADHERENT FILM AND FOIL
William Paul Kane, Bon Air, Va., assignor to E. I. du Pont de Nemours and Company, Wilmington, Del., a corporation of Delaware
No Drawing. Filed Apr. 17, 1963, Ser. No. 273,557
18 Claims. (Cl. 117—132)

This invention relates to films and foils and more particularly to the preparation of polymeric films, and metal foils suitable for the application of very firmly bonded coatings or for fabrication into strong laminates with other polymeric films or various metal foils. More specifically, the invention relates to the production of polymeric and metal foils which have been treated with a polyalkylenimine adhesion promoting agent and which are non-blocking.

In the preparation of moistureproof, heat sealable, transparent regenerated cellulose film, a solution or dispersion of sodium cellulose xanthate (viscose) is cast through a thin die into a sulfuric acid-sodium sulfate solution, which first coagulates the cellulose xanthate into a coherent sheet, then decomposes the xanthate to yield a moisture laden, or gel regenerated cellulose film. The freshly formed gel film is subsequently purified by desulfuring, bleaching and washing as it travels through a series of treating baths.

As a general rule, the last treating bath contains a plasticizer, such as glycerin, ethylene glycol, propylene glycol, urea or some other hygroscopic material to improve the flexibility and durability of the film, and a polymeric adhesion promoting agent or anchorage resin to improve the bonding between the hydrophilic cellulosic film and a hydrophobic, moistureproof coating, later to be applied. After emerging from the last treating bath, the plasticized, anchor-resin impregnated gel film is dried over a series of dryer cylinders to a moisture content of about 10% then is collected in the form of a cast mill roll, which is placed in storage while awaiting the moistureproof coating operation. The coating is then applied continuously to the film as the cast mill roll is unwound at a high rate of speed, which is generally 2–5 times faster than the speed at which the mill roll was originally cast and wound. Hence, it is necessary that the film in the cast mill roll unwind freely or else it will break during the coating operation.

Unmodified polyalkylenimines (referred to in the description which follows simply as polyalkylenimines) have proven to be among the most effective anchorage resins for bonding polymer coating to cellophane. However, even when used in low concentration, these resins are notorious for causing "blocking," i.e., sticking together of adjacent layers, of cast cellophane when in mill roll form. In fact, this blocking problem has proven to be so severe that it has been impractical to employ unmodified polyalkylenimines as anchorage resins for cellophane, produced by the processing techniques employed in this country. Various alkylated polyalkylenimines described in U.S. Patent 3,009,831 can be used to minimize the difficulty due to "blocking." Unfortunately, the alkylated polyalkylenimines are rather expensive and difficult to manufacture and are considerably less effective, on a weight basis, than the unmodified polyalkylenimines as anchorage agents.

It is also known that the blocking tendencies of cast cellophane can be reduced by impregnating the gel film prior to drying with aqueous dispersions of various insoluble waxy materials such as carnauba wax, montan wax, fatty amides, etc. However, such insoluble materials are difficult to disperse and apply uniformly to the gel film without causing the resulting dried film to have a blushed and striated appearance, and, furthermore, when such materials are deposited on the surface of an anchorage resin impregnated film in sufficient quantity to prevent blocking, they negate the effectiveness of the anchorage resin in bonding polymeric coatings applied to the film.

Similar problems are encountered in the production of hydrophobic films which are treated with polyalkylenimine to promote adhesion. In practice, plastic or metal foils are treated with the polyalkylenimine by drawing the foil through a solution of the agent or the agent may be applied by spraying or dipping, the solvent is removed and the treated foil is stored in rolls or is cut into sheets and stacked prior to the laminating or coating operation. In either case, it is a frequent occurrence for the treated foil so stored to block severely in the stored roll or in the stacked sheets. The roll of treated foil cannot be unwound or the stacked treated sheets cannot be separated for subsequent operations without tearing or leaving a surface much impaired in appearance. This result appears to be especially prevalent when use of aqueous solutions of the adhesion promoting agent is attempted for treating the foils and where a high concentration of the agent is required to insure adequate adhesion. The use of aqueous solutions is much preferred over organic solvent solutions of the adhesion promotor for reasons of economy and to avoid possible operational hazards from flammability and toxicity of various organic solvents.

It is, therefore, a principal object of this invention to provide non-blocking films of good appearance bearing an adhesion promoting agent. It is a further object to provide a film bearing a polyalkylenimine resin in sufficient quantity to insure a high degree of bonding to a subsequently applied polymeric coating or in laminates to plastic and metal foils. Still another object is to provide a film with a hydrophilic surface having a moistureproof, heat-sealable, polymer coating which resists delamination when exposed to moisture wherein the coating is bonded to the hydrophilic surface by an unmodified polyalkylenimine. Still another object is to provide a sheet structure with a hydrophobic surface which is bonded by an unmodified polyalkylenimine to another shaped structure having a hydrophobic surface. Still another object is to provide a simple and inexpensive method for producing such films. The foregoing and related objects will more clearly appear from the detailed description which follows.

These objects are realized by the present invention which, briefly stated, comprises applying to a base sheet a solution consisting essentially of a polyalkylenimine and a surface-active agent in proportion and in amount effective to uniformly deposit on and/or in the surface of said base sheet at least about 5 milligrams of polyalkylenimine and between about 2 and about 30 milligrams of surface-active agent per square meter of the surface of the base sheet and thereafter drying said base sheet to remove solvent. In the case of the hydrophobic plastic and metal foils, the polyalkylenimine and surfactant will remain substantially on the surface, while in the case of the hydrophilic sheets, the applied materials will penetrate to some extent into the surface layers of the sheet. The amount of surface-active agent required is related to the amount of polyalkylenimine which need be employed, larger quantities of surface-active agent being necessary as the amount of polyalkylenimine is increased, the ratio of the two being dependent to some extent on the nature of the substrate.

The following is a diagrammatic illustration of the product of this invention:

Surface and/or subsurface layer of polyalkylenimine and surface-active agent hyrophobic or hydrophilic base sheet A preferred embodiment of this invention involves the treatment of a hydrophilic regenerated cellulose film. This entails passing a continuous sheet of purified gel regenerated cellulose film through an aqueous bath, maintained at a pH between 6.5 and 7.5, containing from 0.1 to 1.0% of a polyalkylenimine, e.g., a polyethylenimine having a viscosity within the range of about 2.2 to about 2.8 centistokes when measured at 1% concentration in aqueous solution at 100° F., scraping or squeezing off the excess bath as the film emerges from the bath, then passing the polyalkylenimine-impregnated film through another aqueous bath containing the usual concentration of a softening agent, such as glycerine or other polyalcohol and, in addition, about 0.02 to 0.30% of a water soluble surface-active agent. The softened film is then withdrawn from the bath, the excess bath scraped from the film surfaces, and subsequently the film is dried in the usual manner on steam heated dryer rolls to a moisture content of less than about 10%, and is finally wound onto a core as a cast mill roll. The resulting dried film containing preferably between about 10 and about 25 milligrams of the polyalkylenimine and between about 5 and about 15 milligrams of surface-active agent per square meter of the film surface (i.e., double these quantities per square meter of film for a film treated on both sides) is light in color, free of blush and striations, and shows no tendency to block, even after prolonged storage of several days or weeks. The film is quite suitable for use in the production of moistureproof, heat-sealable, well-anchored coated film by the high speed application of one of the many known polymeric coatings, since it is easily unwound from the cast mill roll during the coating operation and the presence of the surface-active agent has no degrading influence upon the anchoring ability of the polyalkylenimine, as do known anti-blocking agents.

Although the process just described is a preferred procedure for carrying out the treatment of regenerated cellulose film, it should be emphasized that alternate methods may be used with satisfactory results. If desired, the surface-active agent may be incorporated into the polyalkylenimine bath, instead of in the softener bath; or alternately, the polyalkylenimine, surface-active agent and softener may be contained in a single bath. Preferably, the polyalkylenimine and surface-active agent are incorporated into regenerated cellulose film while it is still in the wholly wet, or gel state. However, if desired, the film may be either partially or completely dried before the anchoring agent and anti-blocking agents are applied. Aqueous solutions of these agents are preferred for treating the film, but alcoholic solutions or solutions in other organic solvent media may be employed where warranted.

In treating sheet structures having a hydrophobic surface it is preferred to incorporate the polyalkylenimine and the surface-active agent in a single aqueous bath to insure uniform application of the adhesion promoting agent. The sheet structures may be drawn through or dipped in the aqueous solution or the aqueous solution may be applied to the surface of the sheet structure, for example, by spraying, by roll applicators, by brushing or by other application means known in the art. The amount of polyalkylenimine deposited on and in the surface preferably should be between about 10 and about 75 milligrams per square meter of film surface and the amount of surface-active agent between about 5 and about 30 milligrams per square meter of film surface.

The preferred polyalkylenimines for use in the process of this invention are those derived from the homopolymerization of one or copolymerization of two or more of the lower 1,2-alkylenimines (aziridines) wherein the alkylene radical contains from 2–8 carbon atoms. Because of the availability and relatively low cost, polyethylenimine and polypropylenimine are particularly preferred; and in the treatment of regenerated cellulose film it has been found that polyethylenimine having a viscosity within the range of about 2.2 to about 2.8 centistokes as measured at 1% concentration in aqueous solution at 100° F., is particularly effective from the standpoints of blocking and anchorage. The polyalkylenimines derived from 1,3-alkylenimines (azetidines) may also be employed, if available, since they possess chemical and physical properties similar to the polymers derived from the 1,2-imines.

It is further preferred that the polyalkylenimine used in this invention have a molecular weight within the range of from about 30,000 to about 500,000, since such materials are strongly absorbed by cellulose, are non-toxic, and can be conveniently handled and stored without gelation in the form of concentrated solutions (i.e., 20–30%). Polyalkylenimines having very low molecular weights, below about 5000, are less effective as anchorage agents, and are more easily extracted from the film; while those having very high molecular weights, about 800,000, are much less soluble in water and yield thick syrupy solutions at high concentration and, when employed in the preferred process of this invention, yield films which are prone to block even though high concentrations of surface active agent are employed. In general, the linear polyalkylenimines are preferred over the cross-linked varieties, since they may be employed with satisfactory results using a lower concentration of surface-active agent to prevent blocking and also are somewhat less prone to precipitate and form a sludge in the presence of impurities.

Although the pH of the aqueous polyalkylenimine bath applied to the cellulose film is not critical as far as blocking and anchorage are concerned, the color of the resulting film is lighter and there is less accumulation of sludge in the treating bath, if the pH is maintained in the range of about 6.5 to 7.5. When sludge forms, it tends to build up in deposits on the glass tubes or rods which are located beneath the surface of the solutions in the tank containing the polyalkylenimine solution and any sebsequent tanks such as those containing the solution or surface-active agent and softener solution. Such buildup often causes undesirable streaks or scratches on the film. It has been found that buildup of these deposits can be materially lessened by fabricating the tubes or rods from a highly fluorinated polymer or coating the said tubes or rods with a highly fluorinated polymer. Typical fluoriented polymers which serve this purpose include polymers and copolymers of tetrafluoroethylene, hexafluoropropylene, chlorotrifluoroethylene, and similar monomers, sold under trade names such as "Teflon" (Du Pont registered trademark) and "Kel-F" (Minnesota Mining and Manufacturing Co. registered trademark).

The preferred surface-active agents for use in this invention are the anionic agents selected from the group consisting of alkali metal salts and ammonium salts of alkyl sulfonates, alkyl aryl sulfonates, sulfonated fatty acids, fatty acid ester sulfonates, fatty acid amide sulfonates, and sulfates of fatty alcohols. The following specific surface-active agents are representative of the many commercially available compounds from this group which may be employed for purposes of this invention: dodecylbenzene sodium sulfonate, sodium glyceryl monolaurate, dioctyl sodium sulfosuccinate, sodium $\beta$-oleylethanesulfonate, sodium, $\beta$-stearamidoethanesulfonate, sodium cetyl sulfate, sodium lauryl sulfate, sodium salt of sulfate ricinoleic acid, sodium $\alpha$-hydroxystearic acid sulfate, sodium salt of $\alpha$-sulfolauric acid ethyl ester, sodium p-isoctylphenoxyacetamidoethane sulfonate, sodium salt of oleylsulfanilic acid, sodium oleyl isethionate, monobutylphenylphenol sodium monosulfonate, sodium oleyl sulfate, dodecyl toluene sodium sulfonate, dodecyl xylene potassium sulfonate, sodium oleyl p-anisidine sulfonate, and isobutyl naphthalene sodium sulfonate.

The sulfur containing surface-active agents are generally preferred because of their good solubility over a wide range of pH, even in the presence of polyvalent metal ions such as calcium, magnesium, iron, etc., which are frequently present in regenerated cellulose film and the various treating baths. Furthermore, such materials are quite stable, are nontoxic and do not decompose at elevated drying temperatures to yield toxic or noxious odoriferous by-products. Of the various classes of sulfur containing surface-active agents those which are alkyl aryl sodium sulfonates or fatty alcohol sodium sulfonates are most preferred; and of these two classes, respectively, dodecylbenzene sodium sulfonate and sodium lauryl sulfate are particularly preferred, chiefly because of their ready availability and low cost.

It should be clearly understood, however, that the structure of the surface-active slip agent is not a critical factor and that any organic compound, either anionic, cationic or nonionic, may be employed with satisfactory results, under favorable conditions, providing the compound used has sufficient surface activity and solubility. In general, organic compounds, which when dissolved in pure water at 20° C. in 0.05% concentration yield solutions having a surface tension of 45 dynes/cm., or less, may be employed. Obviously, not all surface-active agents may be used under any one set of conditions, hence it is necessary to take into consideration the particular properties of the compound being used and adjust conditions accordingly to obtain satisfactory results. For example, the alkali metal and ammonium salts of the $C_{10}$ to $C_{22}$ fatty acids may be employed with satisfactory results only if the concentration of polyvalent metal ions are maintained at a very low level and the pH of the solution is maintained at about 6.5 or above.

As has been indicated above and illustrated in the examples given hereinafter, nonionic and cationic surface-active agents may be employed, if desired. However, as a general rule such agents are considerably more expensive than the preferred surface-active agents, and in addition, many of the cationic ones have the further disadvantages of being somewhat toxic, which makes them unsuitable for use in films to be employed as food-wrapping tissue. Among the many available nonionic and cationic surface-active agents which may be used in the process of this invention are the following: polyoxyethylene stearate, dihydroxyethyl lauramide, lauric myristic alkylolamide, lauric diethanolamide, octyl phenyl polyethoxy ethanol, cetyl dimethyl benzyl ammonium chloride, cetyl dimethyl ethyl ammonium bromide, cetyl trimethyl ammonium bromide, di-isobutyl phenoxy ethoxy ethyl dimethyl benzyl ammonium chloride, methyl dodecyl benzyl trimethyl ammonium chloride, methyl dodecyl xylylene bis-trimethyl ammonium chloride, stearyl dimethyl benzyl ammonium chloride, triethyl cetyl ammonium iodide, and diethyl hexadecylamine hydrochloride.

The mechanism by which the surface-active agents function in this invention to prevent blocking of polyalkylenimine anchorage resin impregnated film is not clearly understood. However, it is believed that they prevent blocking by improving the distribution and penetration of the polyalkylenimine on and into the film before it becomes permanently set, thus preventing excessive local concentration of the resin from being deposited. This may be especially pertinent in the case of treating sheet structures having a hydrophobic surface.

The precess of this invention is applicable to surfaces of any hydrophilic or hydrophobic base material which is known to be adherent to other materials through the agency of polyalkylenimines employed as adhesives or anchoring agents. As representative of such surfaces there may be mentioned, in addition to regenerated cellulose specifically referred to hereinabove, polyethylene, polypropylene, polyethylene terephthalate, polyvinyl chloride and copolymers thereof, polyvinylidene chloride and copolymers thereof, polyamides, rubber, chlorinated rubber, cellulose acetate, painted and lacquered surfaces, aluminum foil, copper wire, steel, magnesium, gold, silver, brass, and metals plated with tin, zinc, nickel, or chromium.

The following examples will serve to further illustrate the principles and practice of this invention.

*Example 1.—Regenerated cellulose film—saran coating*

Ripened viscose is extruded in the usual manner into a sulfuric acid-sodium sulfate coagulation-regeneration bath to form a continuous gel regenerated cellulose sheet, which is subsequently washed, desulfured, bleached and then washed free of impurities. The purified gel film is passed through an aqueous 0.5% solution of polyethylenimine at a pH 7.0, the film is removed from the polyethylenimine solution, the excess is removed from the surface of the film by scraping and the film is then passed through an aqueous softener bath containing 8% propylene glycol and 0.15% sodium lauryl sulfate as an anti-blocking agent. As the softened film leaves the softener-surface-active agent bath, the excess bath is removed from the film by scraping, then the film is dried over steam heated dryer rolls to a moisture content of 7% and finally the dried film is collected in the form of a tightly wound mill roll. The roll of film, which is found to contain 15 mg. of polyethylenimine per square meter of film surface and 6 mg. of sodium lauryl sulfate per square meter of film surface (i.e., 30 mg. of polyethylenimine and 12 mg. of sodium lauryl sulfate per square meter of film), is then wrapped with moisture-proof cellophane and stored for 2 days at room temperature, while awaiting the coating operation. After storage the film is unwound without difficulty, since it has shown no tendency toward blocking, and is coated with a tetrahydrofurane-toluene solution of a vinylidene chloride copolymer, prepared as described in U.S. Patent 2,570,478, to yield two-side moistureproof coated film having excellent appearance, heat sealability (H.S.—350 grams) and anchorage (A—Grade 1) of the coating to the base film.

The details of the methods of testing the film are as follows:

*Heat-seal strength* is measured on coated film, after it has been conditioned for 3 days at 81% relative humidity at 90 °F., by cutting a piece of the film 4″ x 10″ with the grain running in the long or machine direction into two pieces 4″ x 5″ each. The two pieces are super-imposed so that opposite surfaces are in contact. The two pieces of superimposed film are then sealed together at each end at right angles to the grain. A ¾″ wide sealing bar heated to a temperature of 140° C. at 20 p.s.i. pressure contacts the ends for two seconds. The sealed sheets are then cut in half at right angles to the grain. From the center of the two resulting pieces, 1½″ wide strips parallel to the grain are cut. The resulting four sets of strips are tested by opening each set of strips at the free ends, placing them in a Suter testing machine and pulling them apart. The highest force in grams required to pull the strips apart is taken as a measure of the heat-seal bond strength.

*Anchorage* refers to the adhesion of the coating to the base film when in direct contact with water. Samples of coated film are suspended in water at 45° C. for 16 hours and then graded approximately as follows:

Grade 1—no blisters
Grade 2—few blisters
Grade 3—decided blistering
Grade 4—coating sloughs off at blistered or unblistered portions.

The polyethylenimine concentration was calculated from a nitrogen analysis determined by the Kjeldahl method. The sodium lauryl sulfate concentration was found by extracting the film with water and determining its concentration in the extract by the method of Moore and Kobeson (Analyt. Chem. 28, 161 (1956).

A control roll of regenerated cellulose film is prepared by employing the same procedure and conditions described in Example 1, with the exception that the sodium lauryl sulfate is omitted from the softener bath. After the roll of dried film is stored for two days, it cannot be unwound for coating because of severe blocking. In fact, the layers of film are so securely bonded together as to produce a substantial solid cylinder of cellulose, which had to be chopped away with a hatchet to recover the roll core for reuse.

A second control roll of cast regenerated cellulose film is prepared by the same procedure and using the same conditions as Example I, except that instead of using sodium lauryl sulfate in the softener bath, a 0.25% dispersion of 7:3 mixture of potassium cocoanut oil soap and Carnauba wax is employed as the anti-blocking agent, as taught by U.S. Patent 2,095,129 to Drew. This roll of film is non-blocking; however, its appearance is poor because of haze and striations, apparently due to the presence of minute globules of Carnauba wax unevenly distributed on the film surface. Upon being coated with a vinylidene chloride coating similar to that applied to the film in Example 1, the resulting coated film is found to have unsatisfactory appearance and poor anchorage and heat sealability (A–4; H.S. 20 g.).

When too little of the polyalkylenimine or either too much or too little or surface-active agent is employed, the resulting film is unsatisfactory. Typical results are shown in the following table.

| Polyethylenimine (mg/m² of film surface) | Sodium lauryl sulfate (mg./m² of film surface) | Blocking Tendency | Anchorage | Heat Seal Strength (g.) |
|---|---|---|---|---|
| 2 | 2 | Nil | A–4 | 30 |
| 14 | 2 | Severe | A–1 | 455 |
| 18 | 40 | Nil | A–3 | 40 |

*Example 2.—Regenerated cellulose base film—polyethylene coating*

A continuous sheet of gel regenerated cellulose which had been cast from viscose and purified in the usual manner is passed through an aqueous softener bath at pH 6.8 containing 7% propylene glycol, 0.50% polyethylenimine and 0.25% Naccanol NR (sodium $C_{12}$ to $C_{18}$ alkyl benzene sulfonate sold by National Aniline and Chemical Company, Buffalo, New York), the excess bath is removed by scraping, then the film is dried to a moisture content of 7% and collected in roll form. The dried film, which contains 17.5 mg. of polyethylenimine per square meter of film surface and 5 mg. of Naccanol NR per square meter of film surface, is of good appearance and is found to be free from blocking after storage of 2 days.

This film was coated on one surface with a ¼ mil thick layer of polyethylene by the melt-extrusion process described in Canadian Patent 545,282 to Field, to yield coated film having good appearance, anchorage (A–1), heat-sealability (500 g.) and which is well suited for packaging moist fresh meats.

*Example 3.—Regenerated cellulose film—saran coating*

Another roll of cast regenerated cellulose film is prepared as in Example 1, except that the propylene glycol softener bath contains 0.25% ammonium stearate instead of sodium lauryl sulfate. The film is found to contain 18 mg. of polyethylenimine per square meter of film surface and 6 mg. of ammonium stearate per square meter of film surface, and to be non-blocking and to yield good appearing, well anchored (A–1) coated film with good heat-sealability when coated with a saran coating similar to that described in Example 1.

*Example 4.—Regenerated cellulose film—polyethylene coating*

A continuous sheet of purified gel regenerated cellulose is passed through an aqueous softener bath containing 8% glycerine, the excess bath is removed by scraping, then the film is dried to a moisture content of about 75%. Subsequently, the partially dried film is treated on one surface by applying with a metering roll an aqueous solution, at a pH of 7.5, containing 0.5% polyethylenimine and 0.25% Pluronic L62 (a high molecular weight surface active block polymer, containing 80% hydrophilic polyoxypropylene units, and 20% hydrophobic polyoxyethylene units, sold by the Wyandotte Chemical Corp., Wyandotte, Michigan). Drying is then continued to reduce the moisture content to 7% and the dried film, which contains 9 mg. of polyethylenimine per square meter of film surface and 5 mg. of Pluronic L62 per square meter of film surface, is collected in roll form. On unwinding the film after two days of storage, for the application of polyethylene coating as described in Example 2, to the anchor resin treated side, the film is found to be free from blocking and, after coating, yields one-side coated film of excellent appearance and quality (A–1; H.S. 500 g.).

*Examples 5–11.—Regenerated cellulose film—various coatings*

A series of softened cast regenerated cellulose film samples is prepared by the general procedure and conditions of Example 1, except that in each instance the concentration of the polyethylenimine is varied and a different surface-active agent is employed as the anti-blocking agent. Each of the film samples is stored in roll form for two days, then its blocking tendency is evaluated as the film is being coated with either a saran coating composition or molten polyethylene as described in Examples 1 and 2, respectively. The details and results of these examples are given in the following table:

TABLE I

| | Treating Baths | | | | Cast Film | | Coated Film | | | |
|---|---|---|---|---|---|---|---|---|---|---|
| Ex. | Surface-Active Agent | | Polyethylenimine | | Polyethylenimine (mg./m² of film surface) | Surface-Active Agent (mg./m² of film surface) | Blocking Tendency | Type Coating* | Anchorage Grade | Heat Seal Strength, gm./1.5 in. |
| | Name | Percent Conc.[1] | pH | Percent Conc.[1] | | | | | | |
| 5 | Peregal-O [2] | 0.25 | 7.2 | 0.3 | 14 | 5 | Nil | PVCl² | 1 | 350 |
| 6 | Aerosol M [3] | 0.25 | 7.0 | 0.3 | 18 | 6 | Nil | BPE | 1 | 500 |
| 7 | Monopol 48A [4] | 0.25 | 7.5 | 0.3 | 15.5 | 4 | Nil | PVCl² | 1 | 400 |
| 8 | Victawet 58B [5] | 0.25 | 6.5 | 0.3 | 16.5 | 7.5 | Nil | BPE | 1 | 275 |
| 9 | Lathanol LAL [6] | 0.25 | 7.0 | 0.3 | 12 | 5 | Nil | PVCl² | 1 | 340 |
| 10 | Aerosol 18 [7] | 0.25 | 7.3 | 0.3 | 14 | 4 | Nil | BPE | 1 | 490 |
| 11 | Duponol ME [8] | 0.25 | 7.2 | 0.3 | 17 | 5 | Nil | PVCl² | 1 | 250 |

[1] Concentrations based on active ingredients.
[2] Condensation product of oleyl alcohol with 20 moles of ethylene oxide (I. G. Farben Industries).
[3] Myristamido propyl dimethyl benzyl ammonium chloride (American Cyanamide Co.).
[4] Sodium salt of sulfonated castor oil (Chem. Fab. Stockhausen).
[5] Sodium capryl tripolyphosphate (Victor Chemical Works).
[6] Sodium lauryl sulfoacetate (National Aniline and Chemical Co.).
[7] N-octadecyl disodium sulfosuccinamate (American Cyanamide Co.).
[8] Sodium lauryl sulfate (E. I. Du Pont de Nemours & Co.).
*PVCl²=Vinylidene Chloride Copolymer; BPE=Branched Polyethylene.

Example 12.—Saran-coated cellophane—polyethylene coating

A continuous sheet of gel regenerated cellulose which had been cast from viscose and purified in the usual manner, was treated as described in Example 1, dried and thereafter coated with a tetrahydrofurane/toluene solution of a vinylidene chloride copolymer, prepared as described in U.S. Patent 2,570,478. The resulting coated film was drawn through an aqueous solution containing 1.5% of polyethylenimine and 0.6% sodium lauryl sulfate ("Duponol" WAQ–E), the solution being at a pH of 7.0, excess bath was removed by scraping and the film was dried and collected in roll form. The film was found to contain 5 mg. of polyethylenimine per square meter of film surface and 2 mg. of sodium lauryl sulfate per square meter of film surface, and to be free from blocking after a storage of two days. The film was then coated on one surface with a ¼ mil thick layer of branched polyethylene by the melt extrusion process described in Canadian Patent 545,282. The resulting coated film had peel values of over 600 grams after conditioning for 72 hours at 35% RH and over 300 grams after conditioning the film for the same period at 81% RH.

Example 13.—Polyethylene coated cellophane—saran coating

A continuous sheet of gel regenerated cellulose film which had been cast, treated with polyethylenimine and surface-active agent, softened and dried as described in Example 1 and thereafter melt coated with polyethylene as described in Canadian Patent 545,282 was drawn through an aqueous solution containing 2% by weight of polyethylenimine and 0.8% by weight of sodium lauryl sulfate. The film was dried and collected in roll form. The film contained 7 mg. of polyethylenimine per square meter of film surface and 3 mg. of sodium lauryl sulfate per square meter of film surface. The film in roll form which showed no tendency toward blocking after storage period of four days was then coated with the vinylidene chloride copolymer described in Example 12. The final coating could not be peeled from the treated substrate. In a control test, in which the polyethylene coated regenerated cellulose film was treated with a polyethylenimine solution which did not contain the sodium lauryl sulfate the treated roll showed strong evidence of blocking after storing of the roll for about 18 hours.

Examples 14–18

A series of experiments was carried out wherein various substrates were treated on one side with an alkylenimine solution and a surface-active agent and thereafter coated. Prior to coating, each of the film samples was stored in roll form for two days, its blocking tendency was evaluated and the film was thereafter coated with the coating described in the table to follow.

Example 19.—Tetrafluoroethylene/hexafluoropropene copolymer—bonded to copper foil A film of tetrafluoroethylene/hexafluoropropene copolymer (85/15 weight ratio) which had been treated with an electrical discharge in an atmosphere of glycidyl methacrylate as described and claimed in U.S. application Serial No. 36,407, filed June 15, 1960, now abandoned, in the names of R. T. McBride and L. E. Wolinski, was treated on one side with an aqueous solution containing 0.5% polyethylenimine and 0.2% sodium lauryl sulfate. The resulting treated film bearing approximately 50 mg. of the polyethylenimine and 20 mg. of sodium lauryl sulfate per square meter of the film surface was stored in a roll for four days, then unrolled and laminated to bright copper foil at 290° C. under slight pressure. The laminate showed peel bond strength of 5000 grams per inch of film width on a Suter peel tester at a pull rate of 12″ per minute and a peel angle of 180°. A control film made as described above but without the sodium lauryl sulfate in the treating solution blocked severely when rolled up and stored for four days prior to laminating with the copper foil.

Example 20.—Treatment of copper foil—bonding to tetrafluoroethylene/hexafloropropene copolymer A bright copper foil was treated on one side with an aqueous solution containing 0.5% polyethylenimine and 0.25% sodium lauryl sulfate and thereafter dried to deposit on the surface 50 mg. of polyethylenimine and 25 mg. of the surface-active agent per square meter of film surface. The resulting treated foil after storage in a roll for three days was laminated to the tetrafluoroethylene/hexafluoropropene copolymer as described in Example 19 to produce a laminate of the same bonded characteristics. When the copper foil was treated with the polyethylenimine solution without sodium lauryl sulfate and stored in a roll it could not be unwound for the subsequent laminating operation without excessive tearing of the foil. A similar result was obtained with an aluminum foil.

Example 21.—Polyimide/tetrafluoroethylene hexafluoropropene

A film of an aromatic polyimide of the type described and claimed in copending U.S. application Serial No. 169,120, filed on January 26, 1962, now U.S. Patent 3,179,634, by W. M. Edwards, was treated on one side with an aqueous solution containing 0.4% polyethylenimine and 0.2% sodium lauryl sulfate and thereafter dried to deposit on the surface 45 mg. of polyethylenimine and 20 mg. of sodium lauryl sulfate per square meter of film surface. The resulting treated film was rolled up and stored for four days after which it was unwound and laminated at 285° C. under slight pressure to a film of tetrafluoroethylene/hexafluoropropene copolymer (85/15 weight ratio) which had been treated as described in

TABLE II

| Ex. | Base Film | Treating Bath | | | | Treated Film | | Blocking Tendency | Coated Film | |
|---|---|---|---|---|---|---|---|---|---|---|
| | | Surface-Active Agent | | Polyethylenimine | | Polyethylenimine (mg./m.² of film surface) | Surface-Active Agent (mg./m.² of film surface) | | Coating | Adhesion |
| | | Name | Percent Conc. | pH | Percent Conc. | | | | | |
| 14 | A | Duponol ME | 0.15 | 7.0 | 0.3 | 30 | 12 | Nil | PVCl₂ [1] | CNP* |
| 15 | A | ....do........ | 0.20 | 7.0 | 0.3 | 30 | 15 | Nil | BPE [2] | CNP |
| 16 | B | ....do........ | 0.15 | 6.8 | 0.35 | 28 | 12 | Nil | PVCl₂ | CNP |
| 17 | B | ....do........ | 0.15 | 7.2 | 0.25 | 19 | 10 | Nil | BPE | CNP |
| 18 | C | ....do........ | 0.15 | 7.3 | 0.3 | 26 | 12 | Nil | PVCl₂ | CNP |

[1] Vinylidene Chloride Copolymer.
[2] Branched Polyethylene.
*Cannot Peel.
A=Polyethylene terephthalate—biaxially oriented; B=Biaxially oriented polypropylene; C=Biaxially oriented linear polyethylene.

Example 19. The resulting laminate was very firmly bonded; the layers could not be separated without tearing of the film layers. When the polyimide film was treated with polyethylenimine in the absence of sodium lauryl sulfate, then wound in a roll and stored for four days it was found to be so badly stuck in successive layers that it could not be unwound without excessive damage to the film.

It is apparent from the foregoing description and examples that this invention is adaptable to a variety of manufacturing and converting practices for making coated and laminated products, especially where the foil treated for adherability must be stored for a time prior to subsequent coating or laminating operations.

I claim:

1. A process for rendering base sheets adherable to other materials and for rendering said base sheet non-blocking comprising applying to a base sheet a solution consisting essentially of polyalkylenimine derived from the polymerization of 1,2-alkylenimine wherein the alkylene radical contains 2–8 carbon atoms, said polymer having a molecular weight within the range of from about 5000 to about 800,000, and a surface-active agent in proportion and in amount effective to uniformly deposit at least about 5 milligrams of polyalkylenimine and between about 2 and about 30 milligrams of surface-active agent per square meter of the surface of base sheet, and thereafter drying said base sheet to remove solvent.

2. The process of claim 1 wherein said base sheet is organic polymeric film.

3. The process of claim 1 wherein said base sheet is metal foil.

4. The process of claim 1 wherein said surface-active agent is an anionic compound selected from the group consisting of alkali metal salts and ammonium salts of alkyl sulfonates, alkyl aryl sulfonates, sulfonated fatty acids, fatty acid ester sulfonates, fatty acid amide sulfonates and sulfates of fatty alcohols.

5. A process for treating regenerated cellulose film which comprises applying to regenerated cellulose a solution consisting essentially of polyalkylenimine derived from the polymerization of 1,2-alkylenimine wherein the alkylene radical contains 2–8 carbon atoms, said polymer having a molecular weight within the range of from about 5000 to about 800,000, and a surface-active agent in proportion and in amount effective to deposit at least about 5 milligrams of polyalkylenimine and between about 2 and about 30 milligrams of surface-active agent per square meter of film surface, and thereafter drying said surface to remove solvent.

6. The process of claim 5 wherein the polyalkylenimine has a molecular weight within the range of from about 30,000 to about 500,000.

7. The process of claim 5 wherein said solution is an aqueous solution maintained at a pH between about 6.5 and about 7.5.

8. The process of claim 7 wherein said polyalkylenimine is a polyethylenimine having a viscosity within the range of from about 2.2 to about 2.8 centistokes as measured at 1% by weight concentration in water at 100° F., and said surface-active agent is one having a surface tension no greater than 45 dynes per centimeter as measured at 0.05% by weight concentration in water at 20° C.

9. The process of claim 7 wherein the surface-active agent is dodecylbenzene sodium sulfonate.

10. The process of claim 7 wherein the surface-active agent is sodium lauryl sulfate.

11. A base sheet having uniformly adsorbed at the surface thereof at least about 5 milligrams of polyalkylenimine derived from the polymerization of 1,2-alkylenimine wherein the alkylene radical contains 2–8 carbon atoms, said polymer having a molecular weight within the range of from about 50 to about 800,000, and from about 2 to about 30 milligrams of a surface-active agent per square meter of surface.

12. The product of claim 11 wherein the base sheet is an organic polymeric film.

13. The product of claim 11 wherein the base sheet is a metal foil.

14. The product of claim 11 wherein the surface-active agent is an anionic compound selected from the group consisting of alkali metal salts and ammonium salts of alkyl sulfonates, alkyl aryl sulfonates, sulfonated fatty acids, fatty acid ester sulfonates, fatty acid amide sulfonates and sulfates of fatty alcohols.

15. The product of claim 11 wherein the base sheet is regenerated cellulose film.

16. The product of claim 15 wherein the surface-active agent is an anionic compound selected from the group consisting of alkali metal salts and ammonium salts of alkyl sulfonates, alkyl aryl sulfonates, sulfonated fatty acids, fatty acid ester sulfonates, fatty acid amide sulfonates and sulfates of fatty alcohols.

17. The product of claim 15 wherein the polyalkylenimine is a polymer derived from the polymerization of at least one member of the group of 1,2-alkylenimines wherein the alkylene radical contains 2 to 8 carbon atoms, said polymer having a molecular weight within the range of from about 30,000 to about 500,000.

18. The product of claim 17 wherein the polyalkylenimine is polyethylenimine.

References Cited by the Examiner

UNITED STATES PATENTS

| | | | |
|---|---|---|---|
| 3,009,831 | 11/1961 | Wilfinger | 117—145 X |
| 3,058,939 | 10/1962 | Meier | 117—145 X |
| 3,140,196 | 7/1964 | Lacy et al. | 117—75 |
| 3,230,135 | 1/1966 | Hurst | 117—76 X |

FOREIGN PATENTS 786,764  11/1957  Great Britain.

OTHER REFERENCES

Schwartz, A. M., et al., Surface Active Agents, N.Y., Interscience, 1949, p. 44.

ALFRED L. LEAVITT, *Primary Examiner.*

RICHARD D. NEVIUS, *Examiner.*

J. R. BATTEN, JR., *Assistant Examiner.*